Figure 1:
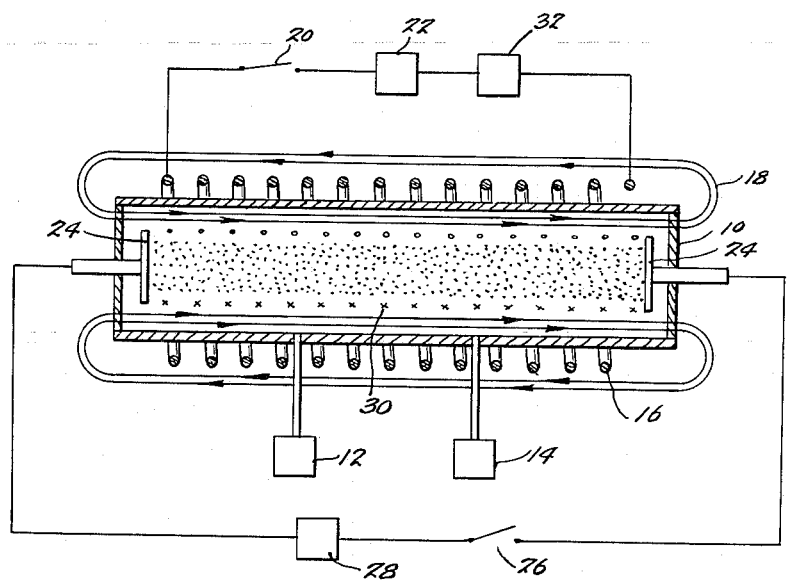

March 20, 1962 D. W. KERST 3,026,447
PLASMA CONTAINING DEVICE
Filed June 10, 1959

Inventor
DONALD W. KERST.
By Soans, Anderson, Luedeka+Fitch
Attys

United States Patent Office 3,026,447
Patented Mar. 20, 1962

3,026,447
PLASMA CONTAINING DEVICE
Donald W. Kerst, La Jolla, Calif., assignor to General Dynamics Corporation, New York, N.Y., a corporation of Delaware
Filed June 10, 1959, Ser. No. 819,354
5 Claims. (Cl. 315—111)

The present invention relates to devices for containing high energy plasma and more particularly to such containing devices which include means for maintaining a confining pressure on the high energy plasma.

When a gas is heated to an extremely high temperature, electrons in the gas atoms have too much energy to stay in their orbits around nuclei; instead, they drift freely in the hot gas. A hot gas of this sort which is composed of free electrons and ions is commonly referred to as a plasma.

The containment of a high temperature plasma presents a problem since heat transfer to the walls of a containment vessel rapidly cools the plasma and may break the containment vessel. Hence, in most plasma containers, magnetic confining fields are set up to pull the plasma away from the container walls. Such a confining field provides a further advantage in that the constricting of the plasma by the magnetic fields further heats the plasma by adiabatic compression.

One way in which a suitable magnetic confining field may be set up is by combining a concentric magnetic field generated by passing a high current through a plasma, commonly known as the "pinch" effect, and a magnetic field established around the plasma by passing a current through one or more coils disposed along the plasma container, commonly known as a stabilizing field.

Ordinarily, magnetic confining fields are made as strong as possible in order to adequately confine the plasma. Accordingly, such fields have been produced by simultaneously pulsing the current through the coils and pulsing the discharge current through the plasma. While such pulsing has resulting in adequate confinement of the plasma on the pulse rise, after the pulse dies out the energy transferred to the plasma during the pulse rise is primarily dissipated to the walls of the container which may result in the cracking or breaking of the container. Moreover, the switching of the high discharge currents has resulted in almost impossible switching problems.

Applicant has discovered that by utilizing alternating current techniques to produce the confining fields a continual pressure may be maintained on the plasma, thus preventing the plasma from contacting the walls of the plasma container. Moreover, applicant has found that by utilizing such alternating current techniques it is possible to extract energy from the reaction plasma in a relatively simple manner.

Accordingly, an object of the present invention is to provide an improved plasma containing device. A further object of the present invention is the provision of a high energy plasma containing device which includes an improved means for maintaining confining pressure on the plasma. Another object is the provision of a plasma containing device which includes means for producing magnetic confining fields by utilizing alternating current techniques. Still a further object is the provision of a plasma containing device which includes means for producing alternating magnetic confining fields which make energy extraction relatively simple.

Other objects and advantages of the present invention will become apparent by reference to the following description and accompanying drawings.

Figure 2:
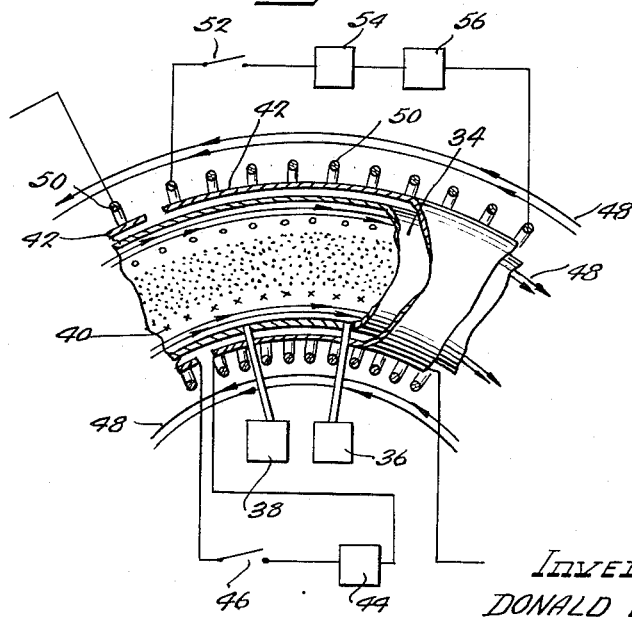

In the drawings:

FIGURE 1 is a diagrammatic cross section of a plasma containing device formed in accordance with the present invention; and FIGURE 2 is a diagrammatic view, partially in cross section, of another embodiment of a plasma containing device formed in accordance with the present invention.

The present device is utilized to contain high energy plasma and comprises means defining a gas-tight chamber. Means are provided for producing a variable discharge current through the chamber and accompanying concentric magnetic field. The device is also provided with means for producing an additional magnetic field within the chamber, the additional magnetic field being varied in such a relationship with the concentric magnetic field that a continual inwardly directed pressure is maintained on plasma within the chamber.

More specifically, in the embodiment illustrated in FIGURE 1, the plasma is contained in an elongated, generally linear, tubular chamber 10 composed of a material having good heat stability and a low atomic number so as to reduce possible contamination of the plasma. The chamber 10 is evacuated of air and other contaminating substances by a suitable vacuum pump 12, and a suitable gas such as deuterium or tritium is delivered into the chamber 10 from a suitable source 14 connected thereto.

A coil or coils 16 are disposed around the outside of the chamber 10 for producing an alternating magnetic stabilizing field 18 within the chamber 10. In the illustrated embodiment, the magnetic stabilizing field 18 is generated by a single helical coil 16 of conductive material wound around the chamber 10, the coil 16 being connected through a switch 20 to a suitable source 22 of alternating current. Passing a current through the helical coil 16 sets up a magnetic stabilizing field 18 which extends generally axially within the chamber 10. The magnetic stabilizing field may also be set up by other well known means such as a plurality of doughnut-shaped coils disposed along the chamber, concentric tubular members, etc.

In the illustrated embodiment, a high discharge current is passed through the plasma in the chamber 10 by a pair of spaced apart electrodes 24 disposed within the chamber 10. The electrodes 24 are connected through a switch 26 to a suitable source 28 of alternating current. The discharge current may also be set up by other commonly known means such as by inducing the discharge current by transformer action, etc.

When the discharge current is produced in the plasma, a concentric magnetic field 30 is generated around the discharge path, which acts to confine the plasma. If the alternating concentric magnetic field 30 generated by electric discharge and the alternating stabilizing magnetic field 18 produced by the coil 16 are in phase, the fields add together. The resulting field approaches a maximum and then decreases to zero, with an accompanying transfer of energy to the chamber wall 10. In order to maintain a continual pressure on the plasma to prevent such a transfer of energy, the concentric magnetic field 30 and the stabilizing field 18 are generated so that they are out of phase with each other (i.e. the vector representing the concentric field 30 is out of phase with the vector representing the stabilizing field 18).

Preferably, for best constancy of magnetic pressure the discharge current is made approximately 90° out of phase with the current through the stabilizing coil 16 and the field strength of the concentric field 30 produced by the discharge current is made approximately equal to the strength of the stabilizing field 18. In this way the resulting field (or resulting rotating vector) maintains a relatively constant pressure on the outer surface of the plasma, the stabilizing field 18 being a maximum when the concentric field 30 approaches zero and vice versa.

It has been found that the resultant alternating field penetrates the plasma and results in improved heating of the plasma. Moreover, it has been found that the heating of the plasma may be optimized by utilizing the proper frequency to excite the stabilizing coil 16 and to produce the electric discharge. As the plasma heats, the frequency may be lowered further than the initial operating frequency so that the heating can continue. Of cource the frequency should not be lowered too far because plasma instabilities would result.

If the plasma is confined long enough at a proper density and at very high temperatures, some of the nuclei within the plasma will collide and fuse, releasing tremendous energy. To extract this energy from the reaction in the plasma, the pressure on the outer surface of the plasma may be slightly varied to allow the plasma to expand and contract. This may be accomplished by varying the the amplitude of the field or by adding a second harmonic of the frequency to the current passing through the stabilizing coil 16.

In the illustrated embodiment, the second harmonic is produced, and at the same time stability is provided in the center of the plasma, by a suitable direct current bias source 32 connected into the stabilizing coil circuit. It has been found that second harmonics do not penetrate the plasma to the extent that first harmonics penetrate and therefore the plasma expands and contracts, resulting in variations in the resultant magnetic field. Such expansion and contraction of the resultant magnetic field may be used to extract energy from the device by means of the well known electric generating principle, that is, a voltage is induced in adjacent circuits by the expansion and contraction of the magnetic field. Thus the energy will be extracted from the reaction at the second harmonic frequency.

In order to safely shut down the device without damaging the chamber wall 10, the amplitude of the alternating current applied to the stabilizing coil 16 and the amplitude of the current producing the electric discharge are decreased very slowly. In this way the heat dissipated on the wall of the container may be taken out as fast as it is deposited by suitable means such as a water jacket (not shown).

The principles of this invention also can be applied to other shapes of chambers such as a chamber in the shape of a figure "8," a chamber in the shape of a toroid, etc. A portion of a toroidal shaped chamber 34, which is provided with suitable confining fields in accordance with this invention, is shown in FIGURE 2. The toroidal chamber 34 is evacuated by a suitable vacuum pump 36 and a suitable gas is delivered into the chamber from a source 38 connected thereto.

A discharge current with its accompanying concentric magnetic field 40 is induced in the toroidal chamber 34 by passing an alternating current through a plurality of tubular segments 42 disposed sequentially about the chamber 34. The inducing of a discharge current in this manner is described in application, Serial No. 743,817, filed June 23, 1958, now Patent No. 2,976,444, issued March 21, 1961. A suitable alternating current power source 44 is connected through a switch 46 to each pair of adjacent segments 42.

As shown in FIGURE 2, an axially directed stabilizing field 48 is set up in the toroidal chamber 34 by a plurality of helical coils 50 disposed about the segment 42, each coil 50 being connected through a switch 52 to a suitable source 54 of alternating current. A direct current bias field is provided in the chamber 34 by a suitable direct current power source 56 connected into the stabilizing coil circuit.

Various changes may be made in the above described plasma containing device without departing from the spirit or scope of the invention.

Various features of the invention are set forth in the accompanying claims.

I claim:

1. A high energy plasma containing device comprising means defining a gas-tight chamber, means for producing a discharge current within said chamber and accompanying concentric magnetic field which current and field have a variable direction and magnitude, and means for producing an additional magnetic field within said chamber which varies in direction and magnitude with respect to the concentric magnetic field, the relationship between the variations in direction and magnitude of the concentric field and the additional field being such that a continual confining pressure is maintained on plasma within said chamber.

2. A high energy plasma containing device comprising means defining a gas-tight chamber, means for producing an alternating discharge current within said chamber and accompanying concentric magnetic field, and means for producing an additional alternating magnetic field within said chamber, said additional magnetic field being out of phase with said concentric magnetic field thereby maintaining continual confining pressure on plasma within the chamber.

3. A high energy plasma containing device comprising means defining a gas-tight chamber, means for producing an alternating discharge current within said chamber and accompanying concentric magnetic field, and means for producing an additional alternating magnetic field within said chamber, said additional magnetic field being 90° out of phase with said concentric magnetic field thereby maintaining continual confining pressure on plasma within the chamber.

4. A high energy plasma containing device comprising means defining a gas-tight chamber, means for producing an alternating discharge current within said chamber and accompanying concentric magnetic field, and means for producing an additional alternating magnetic field within said chamber, said additional magnetic field being 90° out of phase with and being approximately equal in strength to said concentric magnetic field thereby maintaining continual confining pressure on plasma within the chamber.

5. A high energy plasma containing device comprising means defining a gas-tight chamber, means for producing an alternating discharge current within said chamber and accompanying concentric magnetic field, and means for producing an alternating magnetic field which extends axially within said chamber, said axially extending field being 90° out of phase with and being approximately equal in strength to said concentric magnetic field thereby maintaining continual confining pressure on plasma within the chamber.

References Cited in the file of this patent

UNITED STATES PATENTS

| | | |
|---|---|---|
| 2,806,161 | Foster | Sept. 10, 1957 |
| 2,826,708 | Foster | Mar. 11, 1958 |
| 2,831,996 | Martina | Apr. 22, 1958 |
| 2,883,580 | Kilpatrick | Apr. 21, 1959 |
| 2,892,114 | Kilpatrick | June 23, 1959 |